US011899812B2

(12) United States Patent
Donohoe

(10) Patent No.: US 11,899,812 B2
(45) Date of Patent: *Feb. 13, 2024

(54) COMPOUND PLATFORM FOR MAINTAINING SECURE DATA

(71) Applicant: JJD Software LLC, Saratoga Springs, NY (US)

(72) Inventor: Justin Donohoe, Saratoga Springs, NY (US)

(73) Assignee: JJD SOFTWARE LLC, Saratoga Springs, NY (US)

( * ) Notice: Subject to any disclaimer, the term of this patent is extended or adjusted under 35 U.S.C. 154(b) by 421 days.

This patent is subject to a terminal disclaimer.

(21) Appl. No.: 17/344,453

(22) Filed: Jun. 10, 2021

(65) Prior Publication Data

US 2021/0303722 A1  Sep. 30, 2021

Related U.S. Application Data

(63) Continuation-in-part of application No. 16/238,840, filed on Jan. 3, 2019, now Pat. No. 11,038,691.
(Continued)

(51) Int. Cl.
*G06F 21/62* (2013.01)
*G06F 21/60* (2013.01)
(Continued)

(52) U.S. Cl.
CPC ........ *G06F 21/6227* (2013.01); *G06F 21/552* (2013.01); *G06F 21/606* (2013.01);
(Continued)

(58) Field of Classification Search
CPC .. G06F 21/6227; G06F 21/552; G06F 21/606; G06F 21/6218; G06F 2221/034;
(Continued)

(56) References Cited

U.S. PATENT DOCUMENTS

2007/0297607 A1  12/2007  Ogura et al.
2009/0287837 A1  11/2009  Felsher
(Continued)

FOREIGN PATENT DOCUMENTS

WO  2015186820 A1  12/2015

OTHER PUBLICATIONS

Non Final Office Action dated Nov. 14, 2018 for U.S. Appl. No. 15/448,698, filed Mar. 3, 2017; pp. 23.
(Continued)

*Primary Examiner* — Cheng-Feng Huang
(74) *Attorney, Agent, or Firm* — Hoffman Warnick LLC

(57) ABSTRACT

A system, method and program product for implementing a compound security platform for providing secure access to private data in an encrypted storage area. A disclosed system includes an application configured to receive queries from application users requiring access to encrypted private data; a middle security layer callable from the application to facilitate predefined access to the encrypted private data; a root security layer configured to receive a decryption request from the middle security layer, perform decryption on specified encrypted private data, and return decrypted data to the middleware layer; a hashing system that generates a content hash of the middle security layer and root security layer to ensure integrity of the middle security layer and root security layer; and an auditing detection system that detects malicious auditing of parameters.

20 Claims, 8 Drawing Sheets

Related U.S. Application Data

(60) Provisional application No. 62/613,174, filed on Jan. 3, 2018.

(51) Int. Cl.
  *H04L 9/08* (2006.01)
  *H04L 9/06* (2006.01)
  *H04L 9/00* (2022.01)
  *H04L 9/32* (2006.01)
  *G06F 21/55* (2013.01)
  *H04L 9/14* (2006.01)

(52) U.S. Cl.
  CPC .......... *G06F 21/6218* (2013.01); *H04L 9/006* (2013.01); *H04L 9/0643* (2013.01); *H04L 9/0822* (2013.01); *H04L 9/0827* (2013.01); *H04L 9/0861* (2013.01); *H04L 9/0894* (2013.01); *H04L 9/14* (2013.01); *H04L 9/3236* (2013.01); *G06F 2221/034* (2013.01)

(58) Field of Classification Search
  CPC .. G06F 21/64; G06F 2221/2101; G06F 21/51; H04L 9/006; H04L 9/0643; H04L 9/0822; H04L 9/0827; H04L 9/0861; H04L 9/0894; H04L 9/14; H04L 9/3236
  See application file for complete search history.

(56) References Cited

U.S. PATENT DOCUMENTS

| | | | |
|---|---|---|---|
| 2010/0017879 A1* | 1/2010 | Kuegler | G06F 21/54 |
| | | | 726/25 |
| 2013/0055380 A1 | 2/2013 | Swann et al. | |
| 2014/0304505 A1* | 10/2014 | Dawson | G06F 21/6227 |
| | | | 713/165 |
| 2014/0365781 A1* | 12/2014 | Dmitrienko | G06F 21/34 |
| | | | 713/185 |
| 2015/0347772 A1* | 12/2015 | Nizami | G06Q 10/0875 |
| | | | 707/783 |
| 2016/0048690 A1 | 2/2016 | Tanishima et al. | |
| 2016/0285827 A1* | 9/2016 | Gula | H04L 63/1408 |
| 2017/0149740 A1* | 5/2017 | Mansour | H04L 63/045 |
| 2017/0214694 A1* | 7/2017 | Yan | H04L 41/14 |
| 2017/0255784 A1 | 9/2017 | Donohoe | |
| 2018/0232266 A1* | 8/2018 | Ikeda | H04L 9/3226 |

OTHER PUBLICATIONS

Notice of Allowance and Fee(s) Due dated Feb. 18, 2021 for U.S. Appl. No. 16/238,840, filed Jan. 3, 2019; pp. 25.
Notice of Allowance and Fee(s) Due dated May 1, 2019 for U.S. Appl. No. 15/448,698, filed Mar. 3, 2017; pp. 8.

* cited by examiner

US 11,899,812 B2

COMPOUND PLATFORM FOR MAINTAINING SECURE DATA

PRIORITY CLAIM

The present application is a continuation in part application of co-pending application Ser. No. 16/238,840, DATABASE PLATFORM FOR MAINTAINING SECURE DATA, filed on Jan. 3, 2019, which claims the benefit of provisional application Ser. No. 16/238,840, DATABASE SECURITY MODEL, filed on Jan. 3, 2018, the contents of both are hereby incorporated by reference.

TECHNICAL FIELD

The subject matter of this invention relates to data security, and more particularly to a platform for securing data stored via a cloud or on-premise application data store.

BACKGROUND

Data security continues to be significant challenge for information contained in application information repositories. Application information stores utilize computer programs whose primary purpose is to enter and retrieve information, and are used in numerous fields, such as government, medical records, accounting, finance, science, web-based services, and so forth. One of the challenges with implementing application storage is the fact that the data often includes private or sensitive information, such as account information, social security numbers, medical records, etc., and such information is available to employees, developers, system administrators, etc. Accordingly, common strategies for handling private data include ensuring that access is password protected and data encryption.

Although it is relatively straightforward to provide password protection and encrypt data contained in such a data repository to protect user information, problems arise due to the fact that there are often numerous authorized users who have access to the decrypted data. Authorized users, whether acting intentionally or via comprised user credentials, create a significant risk of a data breach. In a typical environment, authorized users may include application users, developers, project managers, and system administrators. Any one of these actors could potentially misuse their credentials to compromise the data. This becomes manifestly more problematic when data is stored in a disparate and/or shared network/domain locations, such as a third party cloud environment, as the vastness of the support systems required to maintain multi-client cloud/network infrastructure increases the number and nature of access accounts that could potentially become a vehicle for the compromise of the data.

Most of the cyber security systems that protect data and information are designed such that a single high-level system account can be used to setup, administer, and (if necessary) deactivate the controls. While establishing a very high level of data security at run-time, most such systems are ultimately established by a single high-level account. All the public and secret keys are entered by this account, modified by this account, and can be read by this account. While some systems provide for separation of duties in an attempt to keep one account from being able to administer all parts of the security system, the accounts are ultimately available to be modified by a single high-level system account that can simply reset the credentials to compromise them from the single admin account. With this high-level account, a cyber attacker has the ability to compromise even the most complex and secure data protection systems. This is the actual attack vector utilized in most of the largest data breaches—a high enough level account that can access the entire system is captured and used to dismantle the protections and extract the data.

SUMMARY

Aspects of the disclosure provide a multi-level security platform in which no single entity is capable of compromising data in an application data repository.

A first aspect discloses a data security system, comprising: a memory; and a processor coupled to the memory and configured to provide a data security service that decrypts encrypted private data for a third party domain, including: a middle security layer configured to receive queries from a remote application controlled by the third party domain, wherein in response to a query involving specified encrypted private data, the middle security layer processes the query, obtains decrypted private data and returns a token to the remote application; a root security layer configured to receive a data decryption request from the middle security layer, perform data decryption relating to obtain the specified encrypted private data using a compound key, and return decrypted private data to the middle security layer; a security infrastructure for pre-establishing an encrypted channel between the remote application and the root security layer; and wherein the data decryption performed by the root security layer includes: receiving a middleware key via the encrypted channel from the application; hashing the middleware key to create a middleware key hash; decrypting an encrypted root key stored in the root security layer with the middleware key hash to generate a root key; and creating a compound key from the middleware key and root key to perform the data decryption.

A second aspect discloses a method to provide security for application data, comprising: providing a middle security layer and a root security layer, each implemented using a separate credential; establishing an encrypted channel between a remote application running in a third party domain and the root security layer; receiving a query at the middle security layer from the remote application, wherein the query involves specified encrypted private data; submitting a request to the root security layer from the middle security layer for decrypted data in response to the query; obtaining a middleware key at the root security layer from the third party domain via the encrypted channel; hashing the middleware key to generate a middleware key hash; decrypting a root key stored at the root security layer with the middleware key hash; creating a compound key from the root key and middleware key at the root security layer; using the compound key to decrypt the specified encrypted private data, and return decrypted data to the middle security layer; generating a token at the middle security layer based on the decrypted data; and returning the token to the remote application.

BRIEF DESCRIPTION OF THE DRAWINGS

These and other features of this invention will be more readily understood from the following detailed description of the various aspects of the invention taken in conjunction with the accompanying drawings in which.

Figure 1:
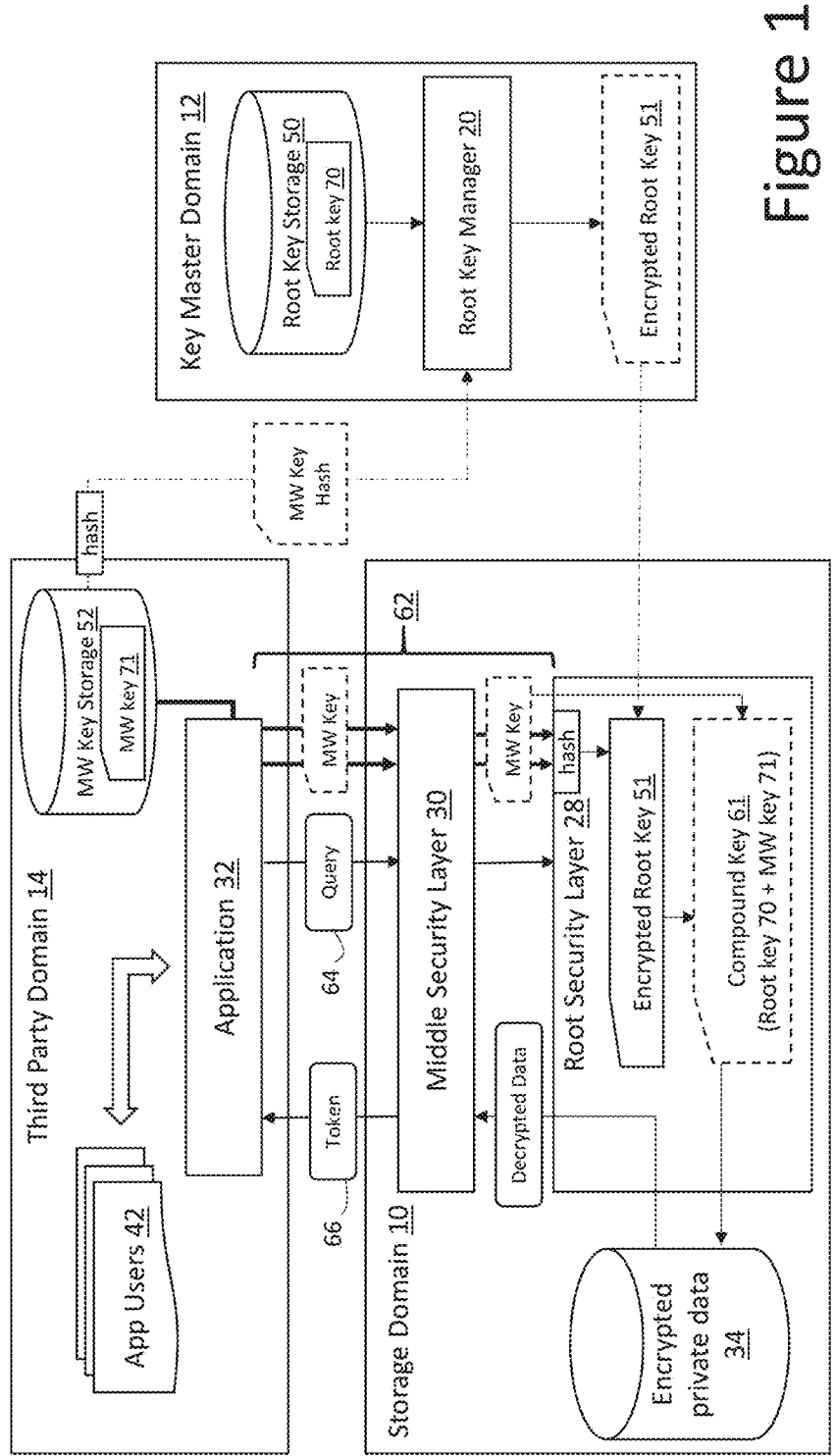
FIG. 1 shows a compound security platform according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The most secure facilities in the world are setup such that a single account, person, key, etc., does not possess the ability to compromise the system. For example, nuclear launch sites require separate keys that are administered by separate individuals in order for a launch. The gold repository at the Federal Reserve Bank in New York City requires multiple keys to open the vault, and no single individual has access to all of the keys. The present solution provides a similar approach and represents a compound storage platform (also referred to as a digital "lockbox" model) for preventing a single admin account from being used to compromise protected assets. In one embodiment, multiple disparate domains are utilized to implement this digital lockbox that allows for standard business functionality and necessary maintenance without exposing protected information to compromise by a single high-level account. The lockbox can also work in conjunction with existing non-sensitive information stores as part of a larger operation.

In various embodiments, a compound storage platform is implemented with at least two separate domains, in which a single admin account cannot be used to access both domains. Each domain may be implemented by a disparate IT infrastructure, e.g., separate cloud services, separate networks, a disconnected database such as Oracle, etc. In various embodiments, domains are considered disparate so long as none of the admin accounts for a domain in the platform that can be used to access or administer other domains. Accordingly, in certain aspects, connected databases such as Microsoft SQL Server, which allows an external network admin to reset the password on the connected database's service account, would not be considered disparate. This would allow access to the database at the system level and thus provide high level access to the database, database keys, and protected data, etc.

As described in further detail herein, at least two separate keys (which may be implemented as at least two key parts) are required, and each key must be housed and accessed on its own separate domain. Note that the multiple keys referenced in this platform are not the same as the public and private keys utilized in asymmetrical encryption and other security models. In these other systems, either of the keys can convert cypher text to plain text. In this lockbox model, all of the keys are required for any encryption or decryption action—no single key is able to unlock the data.

FIG. 1 provides a general overview of an illustrative storage platform for storing and accessing encrypted or "locked" private data 34. The platform generally includes: a storage domain 10 that in this case is responsible for holding, encrypting and decrypting encrypted private data 34; a third party domain 14 to which the encrypted private data 34 belongs (e.g., a customer system); and a key master domain 12 that is responsible for storing a root key 70.

As shown, the third party domain 14 includes a middleware key (MW) storage 52 for storing a middleware (MW) key 71 and also includes an application 32, such as a database application, that allows application users (or clients) 42 to submit queries 64 involving encrypted private data 34 to the storage domain 10 and receive back a token 66. In some instances, the token 66 will not include decrypted data, but will instead include a meta-response (e.g., a yes or no whether an entered query value matches or does not match an encrypted private data value). In other cases, the token 66 may include decrypted data.

The storage domain 10 generally includes a middle security layer 30, a root security layer 28, and in this case, the encrypted private data 34. As further detailed herein, the middle security layer 30 and root security layer 28 are each accessed and established with separate credentials. When a session is established between the third party domain 14 and storage domain 10, a secure (i.e., encrypted) channel 62, e.g., using PKI, is established between the application 32 and root security layer 28. During the session, when an application user 42 seeks information associated with the encrypted private data 34, the application 32 issues a query 64 to the middle security layer 30, which in turn submits a request to the root security layer 28 involving specified encrypted private data. Along with the query/request, the MW key 71 is passed to the root security layer 28 via the secure channel 62. By using the secure channel 62, no entity except the root security layer can view the MW key 71 (including the middle security layer 30, which can only see the encryption). While both the middle security layer 30 and the root security layer 28 can pull the encrypted private data 34, only the root security layer 28 can convert the encrypted private data 34 to decrypted data (i.e., plain text) using a compound key 61.

In various embodiments, the compound key 61 is generated as follows during each transaction. When the MW key 71 is received at the root security layer 28, the MW key is hashed to generate a temporary MW key hash. The MW key hash is used to decrypt an encrypted root key 51 to regenerate the root key 70. Once generated, the root key 70 is combined with the MW key 71 to create compound key 61. Compound key 61 can comprise a concatenation of the two key strings or be functionally combined using some other technique. Once the compound key 61 is generated, the specified encrypted private data is searched/obtained from storage, decrypted and passed back the middle security layer 30, which, e.g., uses a middleware routine to generate token 66.

The role of the key master domain 12 is simply to hold the root key 70 and pre-load the encrypted root key 51 into the root security layer 28, via a one-time operation prior to activation of the platform. The root key 70 is encrypted by the root key manager 20 using a second instance of the MW key hash provided by the third party domain 14 (which should match the MW hash generated by the root security layer 28).

Figure 2:
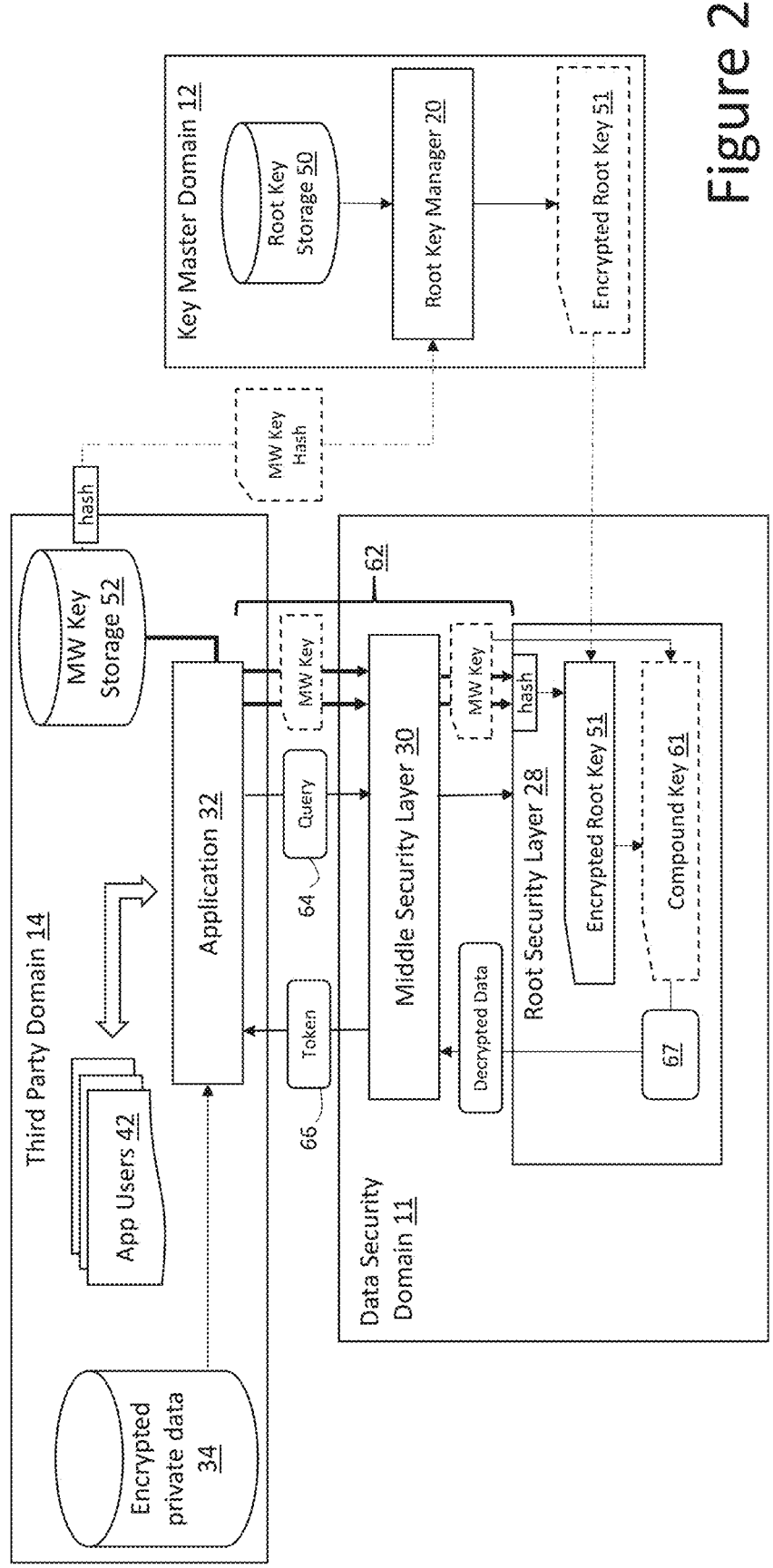
FIG. 2 shows a compound security platform according to embodiments.

FIG. 2 depicts an alternative embodiment in which the encrypted private data 34 is maintained by the third party domain 14 (or some other domain) and the storage domain 10 is replaced with a data security domain 11. The operation is generally similar as the previous embodiment in FIG. 1 except that the query 64 itself includes specified encrypted private data 67 required to complete the query. For example, the application 32 could obtain and pass an encrypted driver's license number along with an unencrypted number in the query to determine if they match. In this case, the compound key 61 gets generated in the same manner and decrypts the specified encrypted data 67 (i.e., encrypted driver's license number) to generated decrypted data for the middle security layer 30. The middle security layer 30 can then, e.g., perform a compare operation to see if a match exists and return a token to the application 32.

In one illustrative embodiment, three main roles in the model include: 1) a Gate Keeper, 2) a Key Master, and 3) Project Lead roles that work together to form a system of checks and balances such that no single actor has knowledge of all keys, and no single actor is able to compromise the system to obtain all of the keys or access information in an unprotected state. The Gate Keeper role is very much like a traditional 'Data Custodian' role, where this role, e.g., either is a system admin on the storage domain 10 (or database administrator on a disconnected database) or works in very close conjunction with one. A typical example of the Gate Keeper is a Database Administrator. The name 'Gate Keeper' is used because this role sets and manages the access rights used by the other elements of the system. They Key Master role is very similar to a traditional Information Security or 'InfoSec' role. This role is typically very familiar with policy, usually has high level oversight, and can generally set rules and procedures that must be followed. The term 'Key Master' is used because this role is responsible for the key(s) made available to a root security layer of the lockbox. The Project Lead or Customer role is very similar to the traditional Data Owner role, where this role either is a manager and/or network admin on the non-lockbox network or works in very close conjunction with one. The term 'Project Lead' is used because this role coordinates the actors that need to utilize the information stored in the lockbox, either for their own functional needs or on behalf of others (such as business or application users).

Figure 3:
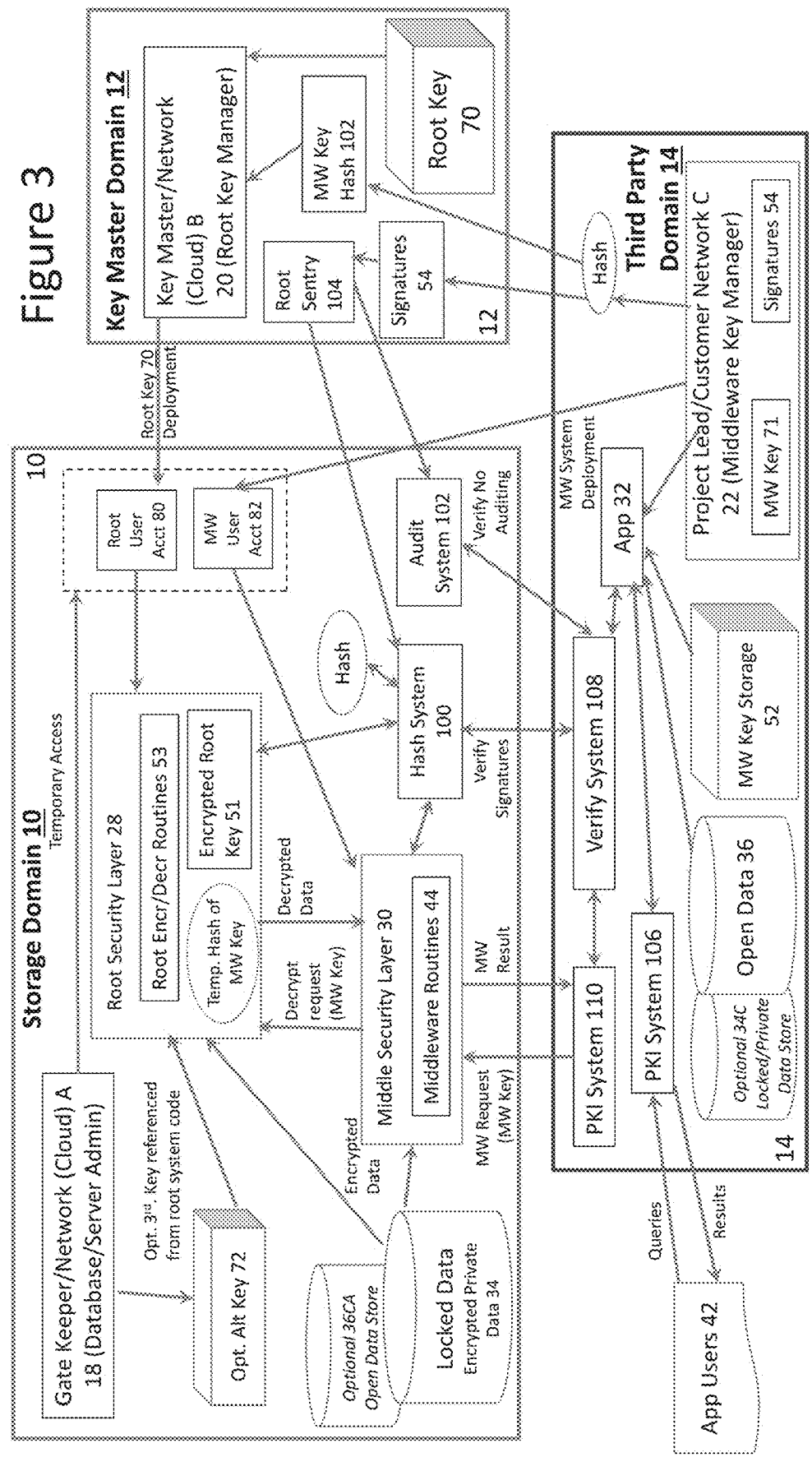
FIG. 3 shows a compound security platform according to embodiments.

FIG. 3 depicts a further illustrative overview explaining the lockbox model. In this illustrative embodiment, data is locked by utilizing a root security layer 28 and an encrypted root key 51, that must at all times be kept separate from third party domain 14. Sensitive information such as Protected Personal Information (PPI) (e.g., Social Security Numbers) is locked and processed entirely within storage domain 10 and, once locked, remains locked and any processing of this data that requires unlocking occurs solely within domain 10. Since keys are typically cycled periodically and also for processing efficiency, the encrypted private data 34 is often stored within domain 10 and is also referred to as "locked" data 34. Though this is recommended, this is not required and so long as the data remains locked it can be stored outside of domain 10 such as in domain 14 as optional 34C (34C data would just need to be passed into platform 10 for any necessary processing in this scenario). Additionally, open data such as job title depicted in domain 14 as open data 36 can reside in domain 10 as optional 36A.

To effectuate this process, the domain 10 includes a security layer available to application 32 in domain 14, referred to herein as a middle security layer 30 and a second root security layer 28 accessible only by middle security layer 30. The middle security layer 30 includes middleware routines 44 designed to handle specific predefined requests from the application 32, e.g., does this SSN match any in the database? Is this person over 21 years old? In response to receiving such a request, the middle security layer 30 sends specific decrypt requests involving private data to the root security layer 28, which includes a root set of encryption/decryption routines 53 designed to decrypt private data and return only required decrypted data results.

As detailed herein, locked data 34 can only be decrypted at the root security layer 28 with a decryption process that requires at least two keys, referred to herein as a root key 70 and a middleware (i.e., MW) key 71. The two keys 70, 71 must both be required to access locked data 34. For example, they may be implemented in a bifurcated process (e.g., a pair of combinable key parts), or using double encryption. In a bifurcated approach, the root key 70 and MW key 71 may each include a string of characters, which when combined, forms a complete decryption key. In a double encryption approach, a first key is used to encrypt/decrypt to an intermediate result, and the second key is used to encrypt/decrypt the intermediate result to a final result. As an optional alternative, it is possible that additional keys such as a third key 72 and respective multi-key encryption algorithm can be employed (a 3+ key approach can also allow for any two of the three keys to encrypt and decrypt the data). Ideally, additional keys such as the third key 72 would be referenced from a storage area (such as a separate table or function) with limited access made available to the root security layer 28 in such a way where a representative variable name pulls in the value such that the Key Master is only aware of the variable name and not the literal value of this key during the process of establishing the root key 70. The added benefit of this two-out-of-three (or more) key encryption algorithm is that if one party loses a key, the other two parties could decrypt and recover the data. The potential concern with this approach, however, is that two parties would be able to decrypt data without the knowledge or consent of the third party. Since this would still require two parties each with separate keys, this meets the criteria of the Lockbox in that no single party could compromise the data. All keys 70, 71 (and optionally 72) are kept separate in order to ensure that no single entity has access to all keys or key parts to access the locked data 34. The root key 70 (which is itself encrypted) is stored in the root security layer 28, while the MW key 71 is passed (via an encrypted channel) into the root security layer 28 for temporary use along with a decryption request. PKI System 110 creates an encrypted handshake between the application (i.e. App) 32 and the root security layer 28. Once established, the MW Key 71 can be encrypted and passed through the middle security layer 30 to the root security layer 28 where it is decrypted, hashed, and then used to decrypt the root key 70 (and optionally additional keys such as a third key) in memory for the period of the interactive session. Once all keys are securely established in memory, then the decryption/encryption routines 53 can be engaged in the root security layer 28. Since the decrypt of the root key 70 will fail if an incorrect MW Key 71 is passed, the MW Key also serves as a validation signature to assure the authenticity of the request. Since most applications such as database systems provide audit features, it is possible that the decrypted key values within a session can be read as they are used and possibly stored in trace logs. The Verify System 108 can call the audit system 102 either prior to or during the handshake to detect if auditing is activated and cancel the request and/or notify the calling system.

Accordingly, during runtime, application (App) users 42 interface only with the front-end application 32, in which they submit queries and receive back results. For retrieving non-private information, the application 32 simply interfaces directly with stores in the open data 36 to obtain the necessary information. If it necessary to retrieve private data to execute an inputted query, the application 32 is not allowed to directly access the locked data 34. Instead, the application 32 must instead make a call to middle security layer 30, which includes one or more middleware routines 44 specifically implemented to handle a request type of a limited nature. For example, each middleware routine 44 is designed for particular business purpose (does this SSN match any in the data store?), as opposed to having carte blanch access to the private data. Based on the requirements specified by the middleware routine (e.g., a birthdate associated with an inputted name), the middle security layer 30 submits a specific decryption request to the root security layer 28 (e.g., decrypt and return the birthday). In many scenarios such as cloud architectures, the middle security layer 30 is made available to the application 32 as a service that can be called from other remote/separate domains such as other cloud services. In these cases, it is strongly recommended to consider housing any sensitive data processing such as open data handling into the root security layer 28. In all cases, security and identity verification is strongly recommended as a safeguard around access to the middle security layer 30.

Thus, as described herein, although the application 32 cannot directly access and return private data from the locked data 34, the application 32 can be implemented with functionality that allows an application user 42 to interface with private data indirectly. For example, an application user 42 may be required to enter a portion of a social security number and a date of birth into the application 32 to determine if there is a match among the locked data 34. In this case, the application 32 can return a yes/no response.

When locked data 34 is required to handle a query, the application 32 submits an MW request to middle security layer 30 which processes the request with a middleware routine 44 and returns a MW result. In some cases, the MW result may include a simple yes/no (e.g., a match exists) or a tokenized value representing protected or sensitive data.

Note that in most implementations, it is preferred that the MW result not include fully decrypted data (masked or tokenized data would be more acceptable), as this would present a point of potential vulnerability for an attacker who obtained the application user 42 or Project Lead 22 credentials (or even could allow a Project Lead 22 to steal the data). If decrypted private data is returned by the MW result, these values may be routed to another external network or domain that is not accessible by the Project Lead 22 or application user credentials and/or very stringent monitoring and auditing is applied to the processes that would receive this information.

To handle the MW requests, middleware routines 44 can be implemented in multiple ways. In a first approach, the middleware routine 44 can use encryption along with a passed-in MW key 71 to encrypt an inputted data record (e.g., an SSN). The encrypted data can then be, e.g., compared to an encrypted record or records in the locked data 34 to determine if a match exists. Using this approach, no data is ever decrypted—instead processing is done by comparing encrypted data records only. In a second approach, the middleware routine 44 can submit a decrypt request, along with the MW key 71, to root security layer 28. Root security layer 28 includes a decryption routine 53 and root key 70 that can be used, along with the inputted MW key 71, to decrypt one or more locked data records. Once decrypted, the decrypted data is passed back to the middle security layer 30, which processes the decrypted data and returns a middleware (MW) result to the application 32. In another approach, encrypted values can be compared against each other (depending on the encryption algorithm employed) directly in their protected format to determine comparisons such as a direct value match between two encrypted SSNs. The middleware routine 44, which is implemented by Project Lead 22 responsible for management of middle security layer 30, can dictate the format of the returned MW result, e.g., plain text sensitive data (strongly discouraged), a masked version of sensitive data that is readable to users, a token representing the sensitive data, a representation of the business process performed on sensitive data such as "yes/no match," etc. As noted, the MW key 71 is not permanently stored in the root security layer 28, but is just temporarily used by the root security layer 28 for the decrypt request.

Thus, using this multi-level security approach, once a middleware routine 44 is deployed to the middle security layer 30, a developer can easily add functionality to the front-end application 32 to access a defined amount/type of private data without having decryption capabilities. Accordingly, neither the application user 42 nor developer can ever compromise the private data.

While this multilayer approach ensures that the application users 42 cannot access private data during runtime, additional safeguards are incorporated to ensure that other actors, such as a Customer or Project Lead 22, database or domain administrator, etc., also cannot readily access private data. One such safeguard involves defining three distinct roles including: a Gate Keeper 18 (e.g., database or server administrator) that can create user accounts and grant temporary access when required; a Key Master 20 who is responsible for maintaining the root key 70; and a Customer or Project Lead 22 who is responsible for implementing middleware routines 44.

As shown, each of the application 32, middle security layer 30 and root security layer 28 are implemented in operationally distinct spaces or realms, such that access to files and processes in one space by a user does not allow for access to another. Each layer 28, 30 may comprise its own physical or virtual server space, requiring a unique user account or credential. Thus, root user account 80, MW user account 82, app 32 developer accounts, and app user 42 accounts are only granted access to their particular layer.

As discussed, in order to decrypt data at the root security level 28, a middleware (MW) key 71 must be passed in. Security platform 10 may be implemented such that either or both the application 32 automatically retrieves the MW key 71 from storage and passes it to middle security layer 30 and/or a qualified and authorized resource such as the Project Lead 22 manually retrieves the MW key 71 from storage and passes it to the middle security layer 30 (and in rare highly monitored and controlled circumstances the root security layer 28) when access to private data is required from the application 32 or a qualified and authorized resource directly. Note that direct access to the MW key 71 with an account other than application users 42 (such as the MW User Acct 82) requires activation of a user account by the gate keeper 18 and authorization from a qualified third party such as the Key Master 20.

Equally important security issues also arise for higher level administrators who traditionally have system level access to all data. For example, it may be determined that the application users 42 require some additional limited private data access to perform their roles in an organization. In this case, a developer under the Project Lead 22 must write a new middleware routine 44, which may require decryption access to the private data. As discussed, the present approach contemplates at least three different administrative roles, none of which are given unfettered access to the locked data 34. These roles include a gate keeper 18, a Key Master 20 and a Customer/Project Lead 22. Accordingly, rather than provide that developer with, e.g., a key, to allow for decryption, the illustrative security platform 10 ensures that no single actor can access locked data 34.

The security platform operates with the following tenets:
(1) Multiple Split Knowledge based Keys—The mechanism used to encrypt or decrypt the data requires at least two separate keys (i.e., the root key 70 and MW key 71). Note that these multiple separate keys are both required to encrypt or decrypt data. This is different than a PKI encryption system where there are two keys, but either of the keys individually can encrypt or decrypt. Any actors who have access to one of the keys or key parts must never be able to access any of the other keys or key parts to combine all of the pieces together and have the complete encrypt or decrypt key solution. For example, if the Gate Keeper 18 and/or Key Master 20 have access to the root key 70 then the Customer/Project Lead 22 must not be allowed to access the root key 70. Further, in this example the Gate Keeper 18 and Key Master 20 must not be allowed to access or compromise the MW key 71.
(2) Separation of Duties—Security duties are broken out into multiple roles creating a system of checks and balances. Each actor in the model has at least one other actor that can perform a check or block against that actor individually compromising protected resources. Also, an established process for requesting, authorizing, and completing system needs is utilized. For example, a database or system administrator cannot complete a request from a developer to have a secure account activated (or any request that was not approved by an established role within the organization). In order for any action to be taken, that action must be authorized by at least one and possibly two (recommended) other qualified roles.
(3) Encryption—The private data is encrypted using a robust algorithm so that the protected resources on their own cannot be read directly—at least one separate key is needed to unlock the data.

The primary accounts and associated roles are as follows:
(1) Gate Keeper 18, which is responsible for user access to the root security layer 28 and middle security layer 30. The Gate Keeper 18 controls user account and credential creation, privileges, and access to objects contained therein. The Gate Keeper 18 may play a role in managing the root key, but does not have access to MW key 71. The gate keeper may optionally take the role of maintaining additional keys such as a third key utilized in the encryption routines in the root security layer 28. Neither the Key Master 20 nor the Project Lead 22 can access the third or alternate key(s). Additional keys will ideally be stored in a separate location 54 but accessible from the root security layer 28. In this way, when the Key Master establishes the root security layer 28 they can do so by referencing a variable such as a function name. In this way, the root encryption routines 53 can access the key without the Key Master being able to see the actual value of the key(s). These additional keys can also be used to support encryption algorithms that allow for any subset of the keys (for example two of the three keys) to decrypt the data. In doing so, if one of the keys is lost the data can still be recovered.
(2) Key Master 20, which is either fully or partially responsible for the root key and establishing the root key 70 in the root security layer 28. The Key Master 20 also performs a very important audit function and can act as a qualified authorizer of requests whose approval is required for any action to proceed within the model. The Key Master does not have access to the MW key 71. The Key Master can also serve in the role of establishing and updating the middle security layer 30 should the Project Lead request this assistance. While they can serve in the role of establishing these layers, The Key Master cannot have credentials to execute or have run-time access to either the root security layer 28 or the middle security layer 30.
(3) Customer/Project Lead 22, which is responsible for the MW key 71. The Project Lead 22 can request actions to be performed by the Gate Keeper 18 (e.g., allow access to the middle security layer 30) but these requests may require the authorization of at least one other qualified role such as the Key Master 20. The Project Lead 22 does not have access to the root key 70.
(4) Developer(s), which are responsible for application development and maintenance. The developer does not have access to any keys that encrypt live or production data, and cannot access live files or servers. Instead, the developer must provide updates and changes to the Project Lead 22. Note that this role is optional and these duties may be performed directly by the Project Lead 22 or the Key Master 20 (for root or middleware updates). Note also that the developer role may include one or many resources of varying levels (e.g., Senior Developer, Technical Lead, etc.).
(5) Security Oversight, which is responsible for reviewing application code for back doors and other intentional breach attempts within the application 32. Note that this role is optional but recommended in cases where, e.g., sensitive data must be rendered in plain text in the application 32. Security oversight can be performed and administered by the Key Master 20 role.

Accordingly, as shown in the illustrative embodiment of FIG. 3, the Key Master 20 is the only role authorized to temporarily administer the root security layer 28 via a root user account/credential 80 when allowed by the Gate Keeper 18 (and optionally approved by the Project Lead 22). Similarly, the Project Lead 22 is the only role authorized to temporarily administer the middle security layer 30 via an MW user account/credential 82 when allowed by the Gate Keeper 18 (and optionally approved by the Key Master 20). Note that the Project Lead can authorize the Key Master to perform updates to the middle security layer, however in these cases the Gate Keeper should seek approval from the Project Lead for these updates. Moreover, the Project Lead should require assurances such as hash signatures to ensure that updates by the Key Master to incorporate vulnerabilities such as capturing the MW Key and/or decrypted sensitive data. As such, access to the root security layer 28 and middle security layer 30 is highly regulated, and ideally requires at least two people aware of the access. This helps to ensure that no individual can for example install code on either system to capture the MW key 71 or root key 70 or otherwise compromise the data.

Even with all the aforementioned safeguards, it is still possible for one of the administrative roles to attempt to obtain unauthorized access to the locked data 34. For instance, the Project Lead 22 role could be used for an attempt to slip malicious code into a middleware routine 44 to obtain back-door access to unlocked data. Accordingly, a further set of precautionary safeguards are strongly recommended to be implemented to ensure no unauthorized code insertions occurred. These safeguards include: (1) a hashing (or signature) system 100 that can hash the routines 44, 53 in the middle security layer 30 and root security layer 28, as well as the hashing system 100 itself; and (2) an auditing detection system 102 that allows for detection of potential malicious auditing of the middle security layer 30 and root security layer 28. For example, malicious auditing could be employed by a bad actor in the platform 10 to attempt to capture keys, key parts, or unprotected data passed as parameters to calls to the security routines therein. (Note that auditing of changes to the system such as a dated log of which user account was used to modify routines, user access, etc., is a separate and very much recommended type of auditing. Therefore, the audit detection system 102 primarily detects auditing that would be used in a potentially malicious manner). Implementation of the each of these security safeguards are described in further detail with further reference to FIGS. 4-7.

Figure 4:
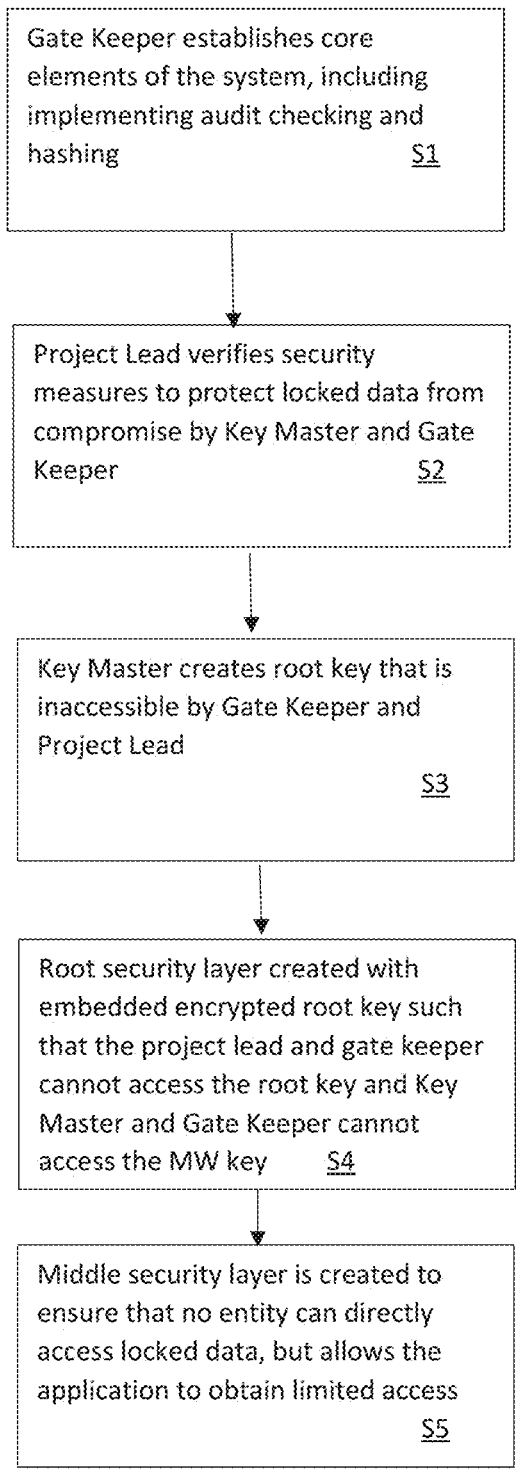
FIG. 4 shows a flow diagram of a set up process for the security platform according to embodiments.

FIG. 4 depicts a process for establishing the data security platform 10. At S1, the Gate Keeper 18 establishes core elements of the system 10, including implementing audit detection and hashing. The Gate Keeper 18 may perform the following tasks:

1. Gate Keeper 18 creates user accounts for the application 32.
2. Gate Keeper 18 creates security system objects (potentially including locked data 34 and open data 36).
3. Gate Keeper 18 creates (or provides access to) an audit detection system 102 having an audit detection routine to allow for checking an audit state in both the middle security layer 30 and root security layer 28. Project Lead 22 and Key Master 20 would work with Gate Keeper 18 to ensure that provided system contains no exploits or vulnerabilities.
4. The Gate Keeper 18 provides an audit detection account/credential that allows Project Lead 22 to read the contents of an audit detection routine.
5. Gate Keeper 18 creates (or provides access) to a hashing system 100 having a hash routine to allow for creating content hashes (or signatures) of existing code routines (including the hash routine itself) to confirm no unauthorized code alterations occurred in the middle and root security layers. Project Lead 22 and Key Master 20 would work with Gate Keeper 18 to ensure that provided system contains no exploits or vulnerabilities.
6. The Gate Keeper 18 provides a hash checking account or privilege that allows Project Lead to execute the hash routine.

Next, at S2, the Project Lead 22 verifies security measures to protect locked data from compromise by Key Master 20 and Gate Keeper 18. These steps may include:

1. Project Lead 22 utilizes known expected values to certify both the audit check routine and hash routine.
2. Project Lead 22 uses the account/credential provided by the Gate Keeper to create a content hash of the audit check routine.
3. Project Lead 22 uses the account provided by the Gate Keeper to create a content hash of the hash routine.
4. Project Lead 22 generates the MW key 71 (e.g., a set of random bytes). As noted, during runtime, the MW key 71 will be combined with the root key 70 to perform cryptography routines in root security layer 28. In the case of a bifurcated key approach, the size of the combined key ultimately used for encryption and decryption (for example 32 characters) will need to be used to determine which portion of the full key will be allocated for the MW key 71 and root key 70 (for example, 16 characters for each).
5. Project Lead 22 creates a hash of the MW key 71. Optionally, the Project Lead 22 additionally creates or obtains a Public/Private Key pair to be used at runtime to establish a shared symmetric key for encrypting communications between the App 32 and root security layer 28 (to further protect all information passed between the App 32 and middle security layer 30 from vulnerabilities such as man-in-the-middle attacks).
6. Project Lead 22 stores the MW key 71 in a secure location (e.g., MW key storage 52) that is accessible by the App 32 (e.g., in a Hardware Security Module "HSM" that returns an encrypted value that is taken in by the App 32 during runtime) but inaccessible by the Gate Keeper 18 and Key Master 20 and Developers. Alternatively, the Project Lead 22 stores the MW key 71 outside of an HSM where it is also inaccessible by the Gate Keeper 18 and Key Master 20.
7. If an HSM is used, then Project Lead 22 sets App 32 to pass the accessible encrypted MW key 71 to the HSM to get back to get back original MW key 71 at runtime. An alternative option is to encrypt the MW key 71 using another mechanism for storing in App 32 accessible location and the decrypt when loaded into the App 32 during runtime. If the MW key 71 is not going to be encrypted, then it will reside in the App accessible location in its original state. Note that the MW key 71 must be stored in a network environment that is controlled by a completely different master account than the environment that houses the root key 70.

Next, at S3, Key Master 20 establishes a root key 70 that is inaccessible by Gate Keeper 18 and Project Lead 22. This may include the following steps:

1. The Project Lead 22 provides the content hash of the hash routine to the Key Master 20.
2. The Project Lead 22 provides the content hash of the audit routine to the Key Master 20.
3. Key Master 20 creates root key 70 (ideally random bytes) and stores it in a secure location that is inaccessible by the Project Lead 22 or Gate Keeper 18. (Note that at runtime, the root key 70 will be combined with the MW key 71 to perform cryptographic routines 53 in the root security layer 28, so if a bifurcated key will be used the size of the combined key ultimately used for encryption and decryption (for example 32 chars) will need to be used to determine which portion of the full key will be allocated for the MW and root key (for example 16 chars for each)). Note also that the root key 70 must be stored in a network environment that is controlled by a completely different master account than the environment that houses the MW key 71. If the root key 70 is to be embedded into a Data Store system where that data store represents a separate domain, then that Data Store system must be able to run in disconnected mode (such as Oracle).
4. The Key Master 20 creates an encrypt script that will allow the Key Master to encrypt the root key 70. The encrypt script will take parameters to embed the value of the root key 70 encrypted with the hashed value of the MW key 71 (and optionally a Private Key to support the PKI process between the root security layer 28 and the application layer 32)
5. The Key Master 20 provides separate identical copies of the script to the Gate Keeper 18 and the Project Lead 22. Note that the actual parameter values are not provided at this time with the script—just the script itself.
6. If approved by Gate Keeper 18, Gate Keeper 18 passes their version of the encrypt script to Key Master 20.
7. The Gate Keeper 18 provides a code checking account that allows Key Master to execute the hash routine.
8. The Key Master 20 uses the code checking account provided by the Gate Keeper to create a content hash of the hash routine.
9. The Key Master 20 compares the returned value from step 8 to the content hash value previously provided by the Project Lead 22. If they do not match, the setup is halted.
10. Key Master 20 creates a content hash of both scripts from steps 5 and 6 and makes sure the hashes match to ensure no tampering. If the hashes do not match, then setup is halted.
11. Project Lead 22 creates a hash of the plain text MW key 71 and provides it to the Key Master 20. (Note that the Gate Keeper 18 cannot be allowed to see the hash of the plain text MW key 71). Optionally, a separate Public/Private Key pair is created, and the Private Key is provided to be embedded into the root security layer 28 to be used for PKI at runtime.
12. The Gate Keeper 18 provides an audit detection account that allows Key Master 20 to read the contents of the audit detection routine.
13. The Key Master 20 uses the audit detection account provided by the Gate Keeper 18 to create a content hash of the audit detection routine.
14. The Key Master 20 compares the returned value from step 13 to the hash value previously provided by the Project Lead 22. If they do not match, the setup is halted.

Key Master 20 uses the hash of the plain text MW key 71 provided by the Project Lead 22 to generate an encrypted value for the root key 70 (passing in as a parameter(s). (Note that the Gate Keeper 18 and the Project Lead 22 cannot be allowed to see the plain text value of the root key 70. Also, the Project Lead 22 cannot be allowed to see the encrypted value of the root key 70. The encrypt script will contain a check that calls the audit detection routine and will cancel out with an error if auditing is detected prior to executing the routines where the keys are passed as parameters.)

Next, at S4, the root security layer 28 is created with the embedded root key 70 such that the Project Lead 22 cannot access the root key 70 and Key Master 20 and Gate Keeper 18 cannot access the MW key 71. This may include the following steps:
1. The Project Lead 22 provides the content hash of the hash routine to the Key Master 20.
2. The Gate Keeper 18 provides a code checking account that allows Key Master to execute the hash routine.
3. The Key Master 20 uses the code checking account provided by the Gate Keeper to create a content hash of the hash routine.
4. The Key Master 20 compares the returned value from step 3 to the hash value previously provided by the Project Lead 22. If they do not match, the setup is halted.
5. The Key Master 20 creates a root script that will create the root security layer routines 53 and embed the encrypted root key 70. These routines 53 will include the cryptography routines for locking and unlocking data where the root key 70 is combined with the MW key 71 and also the routines to create a secure encrypted and authenticated session 110 between the App 32 and root security layer 28. The root script will either have a placeholder or take a parameter to allow for the insertion of encrypted value of the root key 70. (Note that the Project Lead 22 cannot know what the encrypted value of the root key 70 is.) Optionally, a separate private key to be embedded into the root security layer to be used for PKI at runtime is provided as well and included in the root script.
6. The Key Master 20 provides separate identical copies of the root script to the Gate Keeper 18 and the Project Lead 22.
7. If approved by Gate Keeper 18, Gate Keeper 18 passes their version of root script to Key Master 20.
8. Key Master 20 creates a content hash of both scripts from steps 6 and 7 and makes sure the hashes match to ensure no tampering. If the hashes do not match, then setup is halted.
9. The Gate Keeper 18 provides credentials to the Key Master 20 that allows the Key Master to execute the root script and create a content hash of the resulting root security layer 29 with embedded root key 70.
10. The Key Master 20 executes the root script providing the encrypted value of the root key 70 and captures a content hash value of the output. This hash value is kept for verification and provided to the Project Lead 22 and optionally a crypto sentry monitor 104.
11. Gate Keeper 18 revokes Key Master script create privileges.
12. The root script with the encrypted value of the root key is provided to the Gate Keeper 18 who then executes the root script to create the actual root security layer 28 with the embedded value of the encrypted root key 51.
13. The Key Master 20 uses the account/credential provided by the Gate Keeper 18 to create a content hash of the newly created root security layer 28.
14. The Key Master 20 compares the returned value from step 13 to the previous hash value generated in step 7. If they do not match, the setup is halted
15. The Key Master 20 takes a content hash of the root security layer 28 and provides to it Project Lead 22 and optionally crypto sentry monitor 104.
16. Project Lead 22 verifies the root security layer is properly established.

Next, at S5, middle security layer 30 is created to ensure that no entity can directly access locked data from this layer, but allows the application 32 to obtain limited access using a middleware routine 44. The following steps may be used to accomplish this:
1. The Project Lead 22 provides the content hash of the hash routine to the Key Master.
2. The Gate Keeper 18 provides a code checking account/credential that allows Key Master to execute the hash routine.
3. The Key Master 20 uses the account provided by the Gate Keeper to create a content hash of the hash routine.
4. The Key Master 20 compares the returned value from step 3 to the previous hash value provided by the Project Lead. If they do not match, the setup is halted.
5. Developer (or Project Lead) provides encrypt script for creating the middle security layer 30 to Project Lead 22. Optionally, the Project Lead can authorize the Key Master to create and/or execute this script. In this scenario, the Project Lead would notify the Gate Keeper of this authorization.
6. Project Lead 22 reviews the encrypt script to make sure there are no vulnerabilities in the code that would expose sensitive locked data 34.
7. The Project Lead 22 provides separate identical copies of the encrypt script to the Gate Keeper and the Key Master.
8. If approved by Gate Keeper, Gate Keeper passes their version of the encrypt script to Key Master 20.
9. Key Master 20 creates a content hash of both scripts from steps 7 and 8 and makes sure the hashes match to ensure no tampering. If the hashes do not match, then setup is halted. If the Key Master will execute these scripts, the Project Lead will create and compare the hash values.
10. The Gate Keeper 18 provides credentials to the Key Master 20 that allows the Key Master to execute the encrypt script and create a content hash of the resulting middle security layer 30. If the Key Master will execute these scripts, the Project Lead will create and compare the hash values.
11. The Key Master 20 executes the encrypt script to capture a content hash value of the output. This hash value is kept for verification and optionally provided to the Crypto Sentry monitor 104. If the Key Master will execute these scripts, the Project Lead will create and compare the hash values.
12. Gate Keeper 18 revokes Key Master or Project Lead script create privileges.
13. Project Lead 22 requests a create session for MW User acct 82 and credentials from Gate Keeper 18. If the Key Master will execute these scripts, the Gate Keeper will provide these credentials to the Key Master.
14. Project Lead 22 logs on as an MW user to execute the encrypt script for creating the middle security layer 30 to call root routines 53. At the same time, any required seed values are inserted into locked data 34. The generation of the middle security layer 30 routines returns a content hash value that is stored by the Project Lead 22 and is provided to the Key Master and crypto sentry. If the hash value provided to the Key Master by the Project Lead does not match the previous hash value from step 11, Key Master halts the setup. If the Key Master will execute these scripts, the Project Lead will create and compare the hash values.
15. Project Lead 22 or Key Master 20 notifies the Gate Keeper to end the session for the MW user.
16. The Key Master 20 uses the account/credential provided by the Gate Keeper 18 to create a content hash of the newly created middle security layer 30. If the returned hash value does not match with the previous hash value from step 11, then the setup is halted.
17. Middleware routines 44 are deployed with calling access provided to App 32 and App Users 42 (as needed), which will need to pass the MW key.
18. Seed values are inserted into open data 36 data stores as needed.

Figure 5:
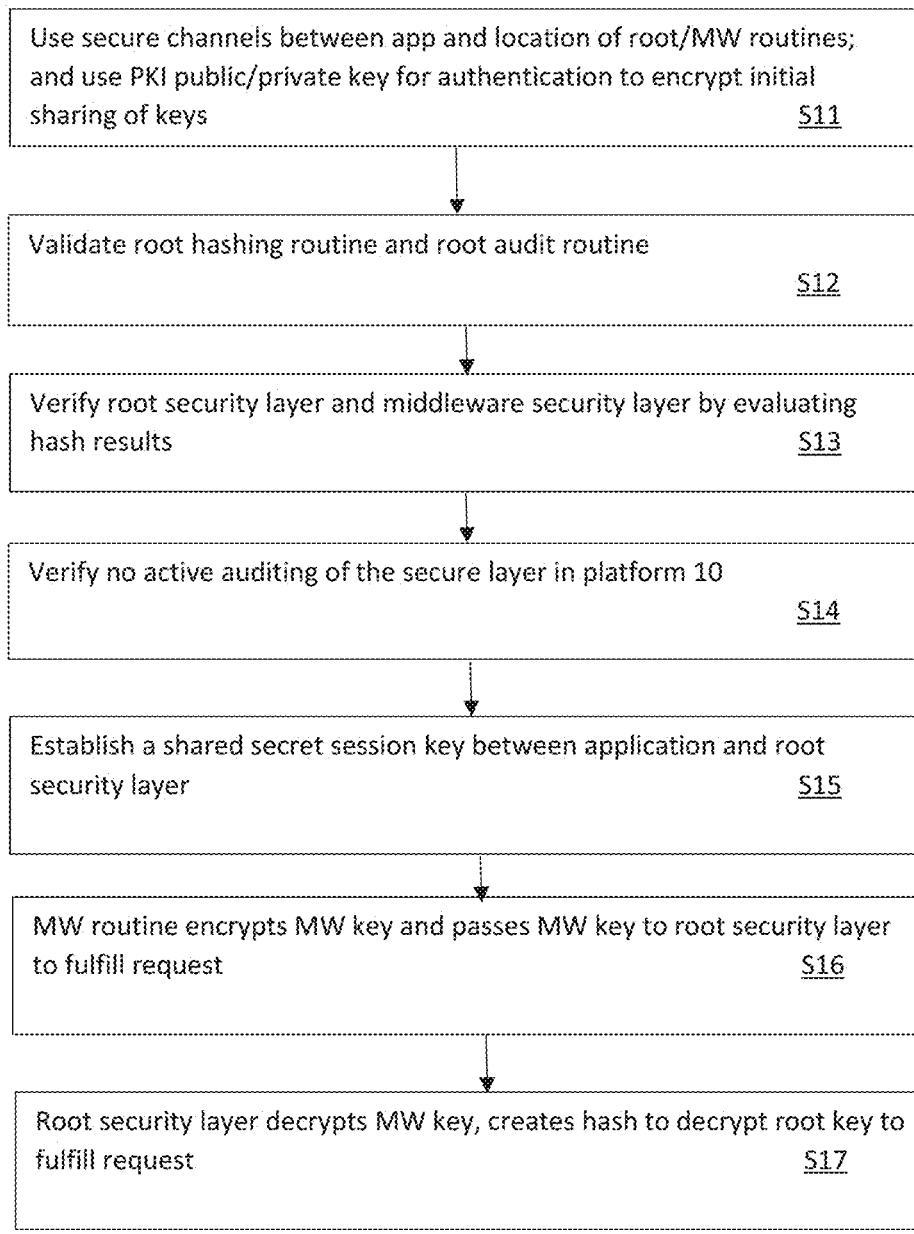
FIG. 5 shows a flow diagram of a runtime process for the security platform according to embodiments.

FIG. 5 depicts an overview of the runtime process when the App 32 needs to access locked data 34. At S11, various security protocols are put into place. Namely, it is very strongly recommended that communications between the App 32 and the data repository where the middle security layer 30 and root security layer 32 code resides be conducted on a secure encrypted tunnel (note that many of these are built into communication protocols). Additionally, a PKI public/private key is recommended to establish a secure handshake to authenticate both the App 32 and data repository side and encrypt the initial sharing of the keys used for secure communications as shown by PKI System 110. This is both to deter any Man-in-the-Middle attacks as well as make it as difficult as possible for the Gate Keeper 18 to be used for compromise attempts to obtain the MW key 71.

At S12, the previously stored content hash of the hash routine is compared to a runtime generated content hash of the hash routine to certify its validity; and the previously stored content hash of the audit detection routine is compared to a runtime generated content hash of the audit detection routine to certify its validity.

At S13, the stored content hash of the root security layer 28 is used to compare against the results returned from the call to the hash routine to verify code has not been altered; and the stored content hash of the middle security layer 30 is used to compare against the results returned from the call to the hash routine to verify code has not been altered.

At S14, a call to the audit detection routine verifies that no active auditing of the root security system in domain 10 has occurred. As noted, auditing in this step does not refer to auditing to determine what changes were made and by whom. Auditing here refers to the ability of the Gate Keeper to turn on tracking of all system calls. In this case, the Gate Keeper could use this audit tracking to see parameter values passed to the root security layer 28 in order to obtain the hashed value of the MW Key. With this value, the Gate Keeper would then be able to provide self-access to the root security layer and call the routines to decrypt the data, thereby compromising the protections. Therefore, the Project Lead 22 must ensure that prior to making any calls that pass the MW Key as a parameter within the domain that the Gate Keeper controls, a check is first made to ensure that auditing that would track and potentially log parameters is deactivated or turned off. This includes any calls made to or by the middle security layer 30. This also includes calls to the root security layer 28. The check to confirm the audit state and hash routine state within get Gate Keeper domain should be made from outside the domain or network controlled by the Gate Keeper. This prevents the Gate Keeper from turning off these controls and then compromising these system checks undetected. Similarly, the App that makes calls to the middle security layer must also make the same check before passing the MW key to the middle security layer.

At S15, App 32 establishes a shared secret session key with the root security layer 28 using PKI System 110. Ideally, this is done using PKI and a previously embedded private key established during the setup process described in FIG. 4. Alternatively, an algorithm such as the Diffie-Hellman protocol can be used. Whether or not PKI is used, a separate and additional secure tunnel is very strongly recommended.

Once the shared secret session key within PKI System 110 is established between App and root security layer 28, the calling routine encrypts the MW key 71 at S16 using the shared symmetric session key and passes to the root security layer 28. The root security layer 28 decrypts the passed in MW key 71 into memory at S17, then creates a hash of the decrypted MW key 71 and uses it to decrypt the stored root key 70 and, in a bifurcated key approach, combines it with the decrypted MW key 71 to hold the full encryption key in memory. Otherwise, both keys are stored separately in memory. Once the full key or separate keys are established in memory, the encrypted MW Key 71 continues to be passed to calls to root security layer 28 to compare against the stored hash to verify authenticity. Optionally, an additional Nonce value can be passed between App 32 and root security layer 28 that changes regularly to deter replay attacks. If the root security layer 28 is able to use the passed in MW key 71 to decrypt the stored root key 70, this establishes that the MW key 71 is valid and further communications are allowed. Otherwise, an error is returned and the root security layer 28 cannot be utilized.

If the root security layer 28 accepts the passed in MW key 71, the root security layer 28 cannot be directly accessed by the App 32 based on the functionality established in the middle security system 30. The audit detection and code integrity checks can be made on each call, only when the MW key 71 is initialized and confirmed, or at intervals in-between. The decision can be based on the trade-off between efficiency and security. Since changes to auditing and compiled code typically trigger a new session, which would initiate a re-check of these elements, calls to check for auditing and code authenticity on session creation are usually sufficient.

With the shared secret session key, sensitive values can be passed and, if necessary, returned encrypted so that they are not vulnerable in transit. The MW key 71 needs to always be passed encrypted. The root key 70 is never placed in transit.

An optional crypto sentry monitor 104 runs and compares stored content hash values for the root security layer 28 and middle security layer 30 against runtime generated content hash values for these routines to verify they have not been altered.

Figure 6:
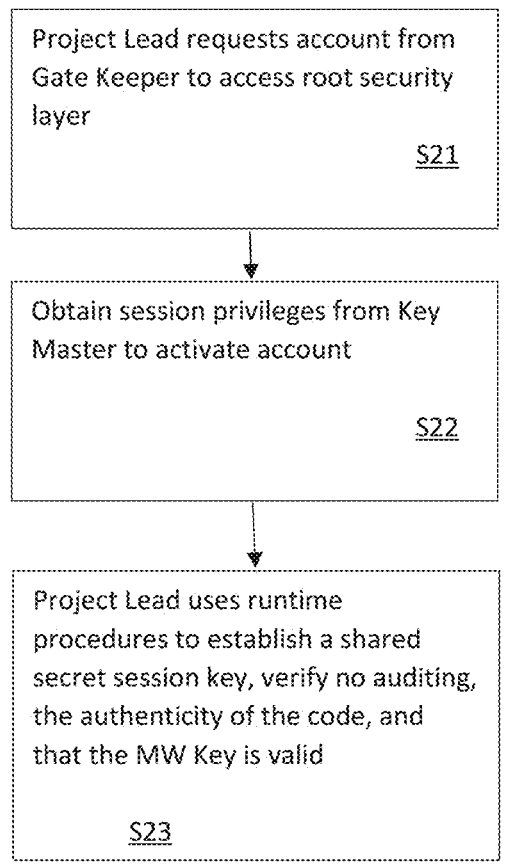
FIG. 6 shows a flow diagram of a maintenance process for the security platform according to embodiments.

FIG. 6 depicts a process for performing maintenance on the security platform 10. A2 S21, the Project Lead 22 can request an account from the Gate Keeper (such as ROOT_PL_USER) that provides direct access to the root security layer 28 (rather than going through the middle security layer 30.). This account is disabled by default, and only gets SESSION privileges at S22 upon a request approved by a 3rd party such as the Key Master 20. When the ROOT_PL_USER account is activated, additional security controls are recommended to monitor activities with this account. Note that the Gate Keeper and Key Master would not be able utilize the ROOT_PL_USER account when activated, because they do not have the MW key 71 required to decrypt the stored root routines 53.

Once the Gate Keeper provides credentials to a Project Lead 22 for the activated ROOT_PL_USER account, the Project Lead at S23 utilizes the same steps as used during runtime process in FIG. 3 to establish a shared secret session key, verify no auditing, the authenticity of the code, and that the MW key 71 is valid. It is strongly recommended that the Project Lead 22 use an encrypted tunnel when calling the root security layer 28 and also incorporate PKI in the initialization process of the script.

Additional features that can optionally be incorporated to enhance security include the following. Items passed in plain text on the wire are vulnerable to breach. Hardware and network protections can be used to mitigate this risk. For example, the unencrypted plain text values returned from a call to decrypt sensitive data for use in the front-end application are susceptible to being compromised by network sniffers. Securing the network can help mitigate these risks The process of encrypting and/or decrypting data occurs in the random or volatile memory within the data store application. While in-process, there is a potential vulnerability for a malicious agent to scrape the RAM in order to compromise the key. Utilizing data store applications that incorporate Software in Silicon (SiS) hardware that prevents external reads (scrapes) will mitigate this risk. Likewise, the operating systems that process the public key and pass the value to the data store application can employ the same protections.

Any time the public key is passed on the wire (network), the connection would ideally be encrypted (i.e. SSL or VPN). This will ensure the key is encrypted in transit and prevent breach via packet sniffing.

Keys (MW and root and optionally a third alternate key) will ideally be stored outside of the application. Care will need to be taken that these keys are not stored in such a way that it would be easy for a malicious actor to compromise the backup where the keys are stored. Strong Encryption tools such as Advanced Encryption Standard with a 256 bit key (AES256) or higher are recommended. A strong source code repository is recommended for storing the code that will house the MW key.

Most data store applications possess filter policy roles that only allow connectivity from specific IP addresses and/or only from calling apps that have a predetermined secret. This functionality can be utilized to prevent compromised credentials from being used to connect to the database from unauthorized entry points. The application connection information will ideally be stored in a secured manner such as encrypting the connection string if stored in a configuration file.

Vulnerabilities may lie within the integrity of the overall architecture (outside the security platform 10). For example, unhandled exceptions within an application can be sources of vulnerability. These can be mitigated by Runtime Application Self Protection (RASP) components, strong firewalls, good software patching practices, network monitoring, etc.

Since most data store applications provide a mechanism to detect the user id, IP address, server name, etc., from the calling entity, additional security can be achieved by adding platform specific code to routines that check for these properties and raise an exception if the server meta data is incorrect.

Some data store applications provide utilities for separating the duties of accounts within the data store. These utilities can help make it more difficult for the Gate Keeper and other SYS level users in the data store to compromise the data and/or the keys.

The keys would ideally be changed every 12 months or less. One means to accomplish this is to write a code routine in the root security layer 28 that takes both the new and the prior root key and makes a call to a root routine 53 to decrypt using prior key passing the prior MW key and then taking the result and calling the root routine 53 to encrypt the data passing the new key. The newly encrypted values would overwrite the pre-existing values.

For applications that need to display plain text sensitive information from the database, system level application user accounts would be able to log in to the application and view data. Consequently, it is most secure if these accounts are disabled and can only be enabled by a Project Lead request approved by an authorized party such as the Key Master.

Sensitive data can be tokenized to add an additional layer of anonymity. For example, random IDs can be created for each client record, and the random id can then be utilized by the application to represent an applicant, using that ID to process sensitive data only when needed. Since the ID on its own could not be used to identify a given person, it is much safer than using personal information as the record identifier.

An alternative approach may be implemented as follows, again with reference to FIG. 1.

The Gate Keeper 18 creates the MW User, APP User and ROOT_PL_USER accounts. Note that it is recommended that accounts be created under the 'Least Privilege' doctrine. In other words, the accounts will be given the least amount of privilege necessary to perform the needs of the account. Additional privileges can be added later if needed if authorized, but it is better to have the account ask for additional privileges rather than automatically have them.

Figure 7:
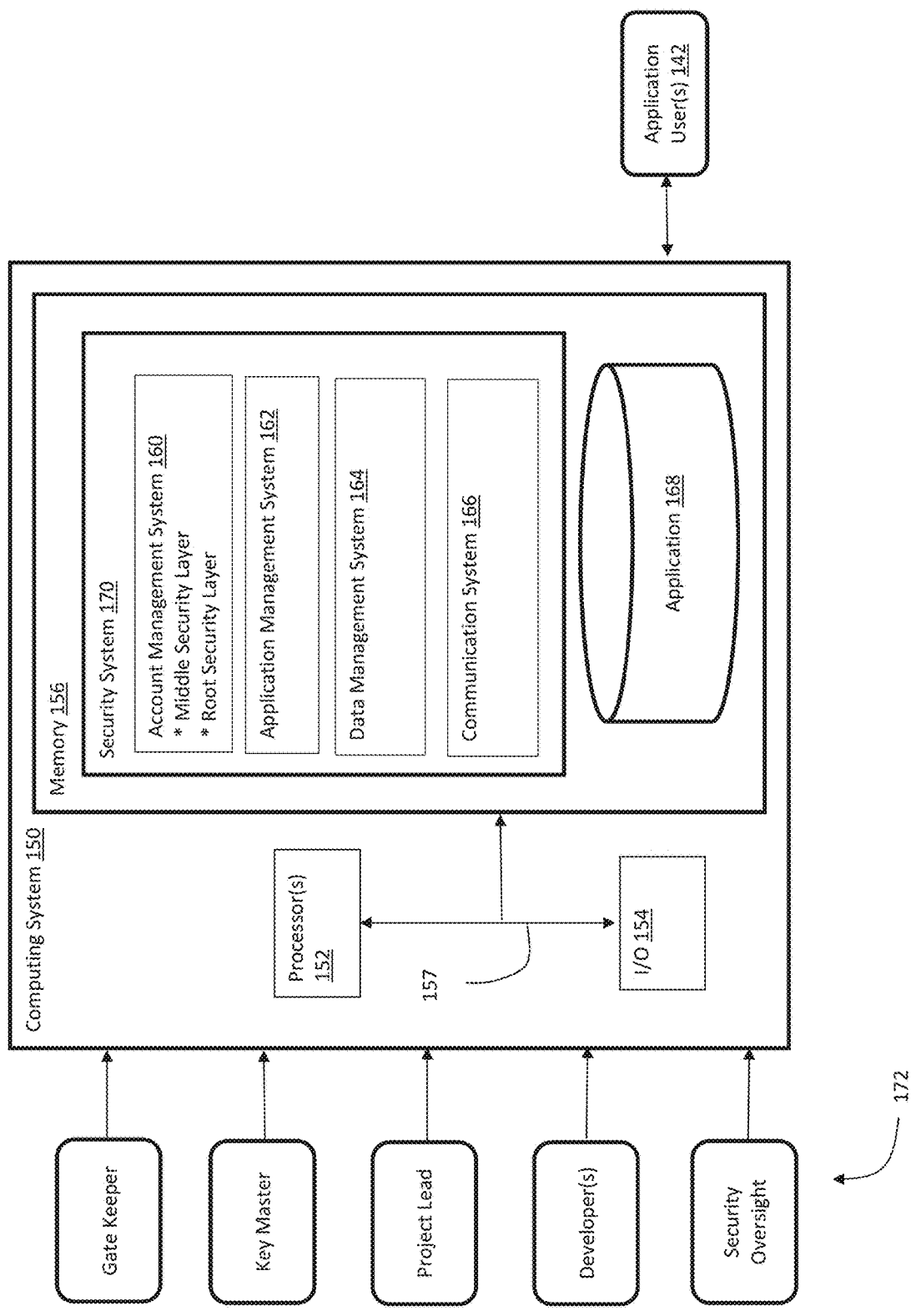
FIG. 7 shows a computing system for implementing aspects of a compound security platform.

FIG. 7 depicts an illustrative computing system 150 for implementing a compound security system 170 to implement to above described compound security platform for an application 168. Compound security system 170 generally includes an account management system 160 for establishing the root security layer 28 and middle security layer 30. As noted, the Gate Keeper role is largely responsible for creating accounts and establishing privileges. As such the account management system 160 would allocate the necessary resources for the Gate Keeper. Application management system 162 is responsible for establishing and managing the application 168. Associated permissions, firewalls, etc., may be handled by the application management system 162. Data management system 164 is responsible for setting up data stores and determining which data belongs in locked data 34 and which belongs in open data 36. Communication system 166 provides a platform through which the different roles can communicate with each other. For example, if a developer wanted to deploy a new encrypted code function 44 (FIG. 3), the developer could pass the code or an associated request to the Project Lead or Key Master via the communication system 166. Security measures include, e.g., hashing system 100 and auditing detection system 102.

Rather than combining the MW and root keys together to create a single master key for encryption, one can opt to double encrypt each value instead with both the program and root keys separately. In this scenario, both the MW and root keys can be the full length of a normal encryption key. Note most DB Systems provide Transparent Data Encryption (TDE) when storing data values to a file. So stored encrypted values are typically double encrypted already.

The root security layer and/or the middle security layer can be housed inside a Hardware Security Module (HSM) rather than a data store application. In this scenario, the root key along with the scripts to execute the code are embedded into the HSM. The HSM will ideally operate under a separate network than the one in which the MW key is housed.

The root key can be stored inside an HSM rather than a data store application. In this scenario, the root key is retrieved by the root security layer. The HSM will ideally operate under a separate network than the one in which the MW key is housed.

It should be noted that any number of alternatives or modifications to the lockbox model described herein may be employed within the scope and spirit of the invention. For example, one possible alternative to the model is to not use the Key Master role. This model would still be effective since a premise of the model is having two separate networks (i.e., the lockbox network and a network for storing the MW key). Given that the Project Lead "controls" the middle security layer and the Gate Keeper "controls" the root security layer, the two could manage the separation without the Key Master. For example, the Project Lead could perform the check on any code put in by the Gate Keeper by checking its hash value before and after. Likewise, the Gate Keeper could perform the check on any code put in by the Project Lead by checking its content hash value before and after.

The main drawback without the Key Master is that the root key would be known to the Gate Keeper (i.e., the Gate Keeper would need to take over for Key Master in creating and storing the root key). However, the Project Lead would be able to keep the MW Key away from the Gate Keeper and still be able to run the Audit and Hash checks to keep the MW Key away from the Gate Keeper at run time. Likewise, the Project Lead would still not be able to access the root key. The other drawback is that there is no designated third party to serve as a check on requests by the Project Lead to activate the account to directly call the root security layer routines. The Project Lead would still be dependent on the Gate Keeper activating the account and confirming the request though, so this satisfies the model in that no single actor can compromise the data. In this alternative there is less security, but it still meets the requirements of the lockbox.

Since the Project Lead would need to be able to pull and read the root security routines to create the hash signature for verification at runtime, the Gate Keeper would not be able to store the root key in the root security layer (because the Project Lead would be able to see it). Therefore, the Gate Keeper would need to store the root key in a separate layer that could be called at runtime by the root security layer to pull in the root key, but in a way where the Project Lead could not access it (such as under an account with no session privileges that only allows read by the root security layer account—which also does not allow session privileges). The root security layer could then include the call to this separate root key space as a variable or parameter that would be consistent to allow for hashed signature validation without exposing the actual key value. The Gate Keeper would need to verify that there are no exploits in the root security routines that would attempt to compromise the root key at runtime.

In this alternative embodiment, one can choose to either use or not use the Key Master role. If used, the Key Master would serve as oversight to add an additional check for change and/or access requests as well as possible auditing.

Another alternative embodiment utilizes cloud mechanisms such as containers to establish the layers required for the components of system 10. Containers can be created with specific components such as those needed to support the root security layer 28, the middle security layer 30, and also any required storage mechanisms for items such as locked data 34. These containers can also contain mechanisms to verify signatures (content hash values) and auditing. Containers themselves can be signed with certificates that verify that they have not been tampered with and will support the establishment of secure tunnels and PKI System 110. Containers can expose callable services, routines and functions and these in turn can support multiple accounts and authenticated access. If the container system being utilized will not run if its own signature no longer matches the generated signature in the certificate or supports generating a signature or content hash in real-time while calls are being made from the App 32, then this will support the requirement to verify that the contents of the container have not been tampered with in such a way that would allow for compromise of any of the keys or key parts and/or any of the sensitive locked data 34. Otherwise, the risk exists that the certificate or signature could be stale and no longer represent the contents of the container. In this case, the individual components of the container that support the root security layer 28 and middle security layer 30 would need to be established utilizing systems that themselves support runtime hashing or signature generation within the container. In this embodiment it is very strongly recommended that secure credentials such as a required secret be required for calls to the middle security layer 30. It is also strongly recommended that multiple level key management container frameworks be employed to help eliminate man-in-the-middle and replay compromise of the container elements and/or the containers themselves.

In an alternative embodiment, the Key Master domain 12 is provided with credentials to be able to call a limited and specialized privacy layer (33). These calls cannot accept the MW key 71 in any form. More likely, these routines accept a token that is returned from a separate call to the middle security layer 30 and will not return sensitive data, but rather perhaps private data such as salary or certain medical information. The Key Master could then expose these same calls to the customer domain 14, which would then provide the token identifiers to receive the private values. Since a second secret credential can be established for these privacy calls through the Key Master domain 12, the customer could establish a means to pull this private data that could be made unavailable to higher level admin accounts within the third party domain 14. Since the Key Master domain 12 would not have access to pull tokens needed to get these private values, only the third party domain 14 could pull these values. Similar signature/hash verification systems can ensure that the calls to the Key Master domain are not compromised.

It is understood that security system 170 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 150 that may comprise any type of computing device and for example includes at least one processor 152, memory 156, an input/output (I/O) 154 (e.g., one or more I/O interfaces and/or devices), and a communications pathway 157. In general, processor(s) 152 execute program code which is at least partially fixed in memory 156. While executing program code, processor(s) 152 can process data, which can result in reading and/or writing transformed data from/to memory and/or I/O 154 for further processing. The pathway 157 provides a communications link between each of the components in computing system 150. I/O 154 can comprise one or more human I/O devices, which enable a user to interact with computing system 150. Computing system 150 may also be implemented in a distributed manner such that different components reside in different physical locations.

Furthermore, it is understood that the data security system 170 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

Figure 8:
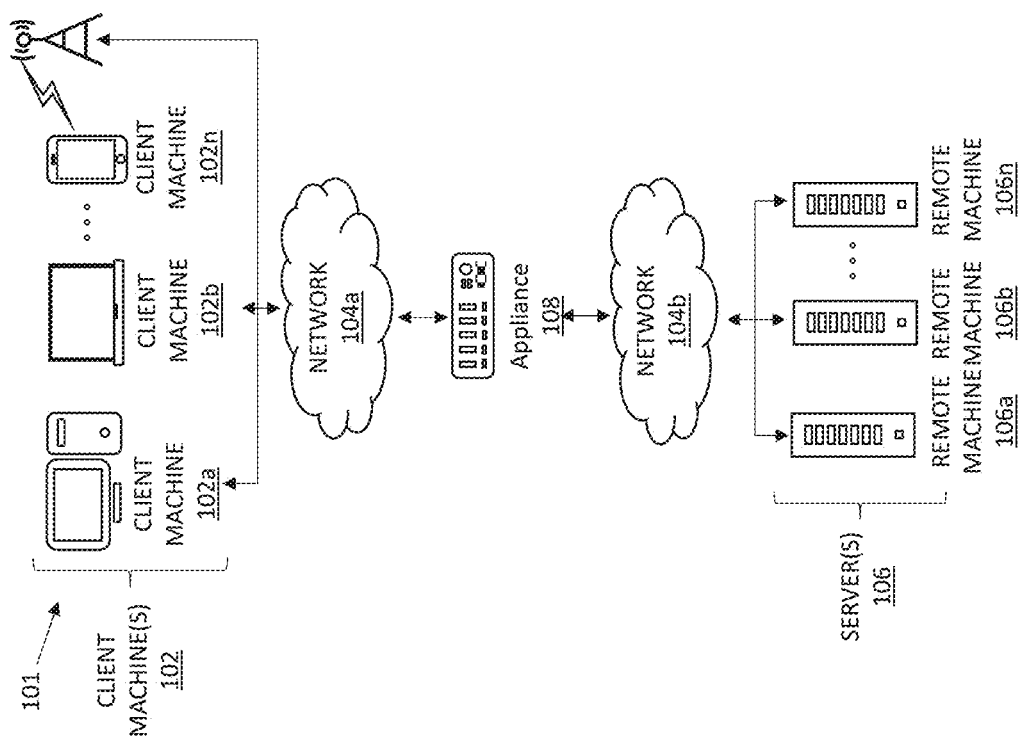
FIG. 8 shows a network infrastructure for implementing aspects of a compound security platform.

Referring to FIG. 8, a non-limiting network environment 101 in which various aspects of the disclosure may be implemented includes one or more client machines (or "devices") 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A data security system, comprising:
a hardware memory; and a hardware processor coupled to the hardware memory and configured to provide a data security service that decrypts encrypted private data for a third party domain, including:
a middle security layer configured to receive queries from a remote application controlled by the third party domain, wherein in response to a query involving specified encrypted private data, the middle security layer processes the query, obtains decrypted private data and returns a token to the remote application;
a root security layer configured to receive a data decryption request from the middle security layer, perform data decryption to obtain the specified encrypted private data using a compound key, and return decrypted private data to the middle security layer;
a security infrastructure for pre-establishing an encrypted channel between the remote application and the root security layer; and
wherein the data decryption performed by the root security layer includes:
receiving a middleware key via the encrypted channel from the application;
hashing the middleware key to create a middleware key hash;
decrypting an encrypted root key stored in the root security layer with the middleware key hash to generate a root key; and
creating a compound key from the middleware key and root key to perform the data decryption.

2. The system of claim 1, wherein the encrypted root key is stored in the root security layer during a prior one-time operation, the encrypted root key being obtained from a key master domain that is functionally separate from both the data security system and third party domain.

3. The system of claim 2, wherein the key master domain stores the root key and generates the encrypted root key with a second instance of a middleware key hash obtained from the third party domain.

4. The system of claim 1, wherein the encrypted private data is not directly accessible as plain text data by the middle security layer.

5. The system of claim 1, wherein the token comprises a meta-response that does not include the decrypted data.

6. The system of claim 1, wherein the token includes decrypted data.

7. The system of claim 1, wherein the encrypted channel is established using PKI.

8. The system of claim 1, wherein the remote application comprises a database application.

9. The system of claim 1, wherein the middle security layer includes at least one middleware routine that:
compares decrypted data with data extracted from the query, and
creates the token that indicates whether a match exists.

10. The system of claim 1, wherein the middleware key is stored by the third party domain.

11. The system of claim 1, wherein the middle security layer and root security layer are implemented and accessed using separate user accounts or credentials.

12. The system of claim 1, further comprising a hashing system that generates a content hash of routines implemented by the middle security layer and root security layer and compares the hash to a previously generated content hash to ensure integrity of the middle security layer and root security layer.

13. The system of claim 1, further comprising an auditing detection system that detects malicious auditing by monitoring for parameters being passed between the middle security layer and root security layer.

14. The system of claim 1, further comprising a storage system for storing the encrypted private data.

15. The system of claim 1, wherein the encrypted private data is stored by the third party domain, and wherein the specified encrypted private data is received by the middle security layer as part of the query.

16. A method to provide security for application data, comprising:
providing a middle security layer and a root security layer, each implemented using a separate account or credential;
establishing an encrypted channel between a remote application running in a third party domain and the root security layer;
receiving a query at the middle security layer from the remote application, wherein the query involves specified encrypted private data;
submitting a request to the root security layer from the middle security layer for decrypted data in response to the query;
obtaining a middleware key at the root security layer from the third party domain via the encrypted channel;
hashing the middleware key to generate a middleware key hash;
decrypting a root key stored at the root security layer with the middleware key hash;
creating a compound key from the root key and middleware key at the root security layer;
using the compound key to decrypt the specified encrypted private data, and return decrypted data to the middle security layer;
generating a token at the middle security layer based on the decrypted data; and
returning the token to the remote application.

17. The method of claim 16, wherein:
the encrypted root key is stored in the root security layer during a prior one-time operation, the encrypted root key being obtained from a key master domain that is functionally separate from middle security layer, root security layer and third party domain; and
the key master domain stores the root key and generates the encrypted root key with a second instance of a middleware key hash obtained from the third party domain.

18. The method of claim 16, wherein the token comprises a meta-response that does not include the decrypted data.

19. The method of claim 16, wherein the middle security layer includes at least one middleware routine that:
compares decrypted data with data extracted from the query; and
creates the token that indicates whether a match exists.

20. The method of claim 16, wherein the encrypted private data is stored by the third party domain.

* * * * *